United States Patent [19]

Katti et al.

[11] Patent Number: 5,478,474
[45] Date of Patent: Dec. 26, 1995

[54] METHOD FOR TREATING LIQUID WASTES

[75] Inventors: Kattesh V. Katti; Wynn A. Volkert; Prahlad Singh; Alan R. Ketring, all of Columbia, Mo.

[73] Assignee: Curators of the University of Missouri, Columbai, Mo.

[21] Appl. No.: 165,373

[22] Filed: Dec. 10, 1993

[51] Int. Cl.[6] ................................................. B01D 15/08
[52] U.S. Cl. .......................... 210/656; 210/679; 210/682; 210/684
[58] Field of Search .................................... 210/679, 682, 210/684, 656

[56] References Cited

U.S. PATENT DOCUMENTS

| | | | |
|---|---|---|---|
| 4,176,158 | 11/1979 | Laidler et al. | 210/682 |
| 4,738,834 | 4/1988 | Moore et al. | 210/682 |
| 5,334,316 | 8/1994 | Bruening et al. | 210/679 |

OTHER PUBLICATIONS

Luykx, F., "Technetium discharges into the environment", *Technetium in the Environment*, eds. G. Desmet and C. Myttenaere, Elsiever Applied Sci., N.Y., 1984, pp. 21–21.
Garten, C. T., *Environ. Int.* 13:311, 1987.
Verrezen, F. et al. "The Measurement of Technetium–99 and Iodine–129 in Waste Water from Pressurized Nuclear-power Reactors", *Appl. Radiat. Isot.* 43:61–68, 1992.
Abelson, P. H., "Remediation of Hazardous Waste Sites", *Science* 255:901, 1992.
Ito, K. et al. "Behavior of Pertechnetate Ion Adsorption From Aqueous Solutions Shown by Activated carbons..." *Carbon* 30:767–771, 1992.
Desmet, G., Myttnaere, C. *Technetium in the Environment*, Elsiever Applied Sci., N.Y., 1984.
De Zoubov, N. et al. "Technetium( )", *Atlas of Electrochemical Equilibria*, Pergamon Press, Oxford, 1966, pp. 294–299.
Ito, K. et al., "Adsorption of Pertechnetate Ion On Active Carbon From Acids And Their Salt Solutions", *J. Radionl. Nucl. Chem.* 152:381–390, 1991.
Ito, K. et al., *J. Nucl. Sci. Technol.* 25:534, 1988.
Del Cul, G. D. et al., " Technetium–99 Removal From Process Solutions And Contaminated Groundwater", *Sep'n Sci and Technol.* 28:551–564, 1993.
Chiarizia, R., *J. Memb. Sci.* 55:39, 1991.
Chiarizia, R. et al., "Application of Supported Liquid Membranes For Removal of Uranium From Groundwater", *Sep'n Sci and Technolo.* 25:1571–1586, 1990.
Boehm, H. P., "Basische Oberflachenoxide Auf Bohlenstoff ..." *Carbon* 8:227–240, 1970.
Katti, K. et al., "Synthesis and Characterization of a Neutral and Lipophilic . . . ", *Int. J. App. Radiat. Isot.* (Abstract submitted).
Katti, K. et al., "Organometallic Phosphinimines as Building Blocks for Potential New Radiopharmaceuticals . . . " *Z. Naturforsch*, 48b, 1381–1385, 1993.

*Primary Examiner*—Ivars Cintins
*Attorney, Agent, or Firm*—Kohn & Associates

[57] ABSTRACT

The method of treating liquid waste in a media is accomplished by exposing the media to phosphinimines and sequestering $^{99}$Tc from the media by the phosphinimine (PN) functionalities. The system for treating the liquid waste in the media includes extraction of $^{99}$TcO$_4^-$ from aqueous solutions into organic solvents or mixed organic/polar media, extraction of $^{99}$Tc from solutions on a solid matrix by using a container containing PN functionalities on solid matrices including an inlet and outlet for allowing flow of media through an immobilized phosphinimine ligand system contained within the container. Also, insoluble suspensions of phosphinimine functionalities on solid matrices in liquid solutions or present on supported liquid membranes (SLM) can be used to sequester $^{99}$Tc from those liquids.

19 Claims, 3 Drawing Sheets

$R = C_6H_5$, $Bu^n$, $C_2H_5$, $CH_3$, $-CH_2CH_2CN$, $p-C_6H_4Cl$, $p-C_6H_4Br$, $-OCH_2=CHCH_2$, $-NMe_2$, $NMeNH_2$

METHOD FOR TREATING LIQUID WASTES

This invention was partially supported with Government support under DOE-DEFGO289ER60875 awarded by the Department of Energy. The Government has certain rights in the invention.

TECHNICAL FIELD

The present invention relates to a method for remediation of $^{99}$Tc from liquid waste. More particularly, the present invention relates to novel chemicals, devices, and methods for selectively removing $^{99}$Tc from liquids thereby providing means for remediation of contaminated media.

BACKGROUND OF THE INVENTION

Environmental restoration and specifically remediation of radioactive contaminants is a field of primary importance in society today. The problem extends to a wide diversity of contaminants, number of sites, and various forms of contaminants, including ground water, storage solution containing various solvents and acidities, and particulates, etc. Remediation of radioactive waste is of prime importance since it is recognized by the public as one of the leading environmental issues of our time.

While removal of a variety of radioisotopes from waste streams in the environment is essential, removal of technetium-99 ($^{99}$Tc) is considered to be among the most important since it makes up a dominant portion of the radioactive nuclides remaining in radioactive wastes after decay periods of hundreds of years (1–5). There is wide world concern about the environmental contamination of $^{99}$Tc. For example, the total deposition from nuclear tests is estimated to be 140 Tbq or 220 Kg. Other sources are related to the different steps in the nuclear fuel cycle. $^{99}$Tc has been and is being produced in nuclear reactors in amount equaling approximately 1 Kg per ton of uranium. Approximately 10% of the mass of the fission products are made up of $^{99}$Tc since its fission yield is 6.13% (2,3,6).

Although the radiotoxicity of $^{99}$Tc is not high, there is major interest in this radionuclide because of its long half life ($2.13 \times 10^5$ years).

For the above reasons, a major goal is to limit the discharge of $^{99}$Tc to the lowest possible level (2,7,8). Therefore it is essential to develop reliable and practical (cost effective) methods to remove $^{99}$Tc from a variety of vehicles, ranging from high-level liquid waste (HLLW) to low levels of radioactivity in ground water.

Integral to the technologies for the removal of $^{99}$Tc from various media is the chemistry of Tc. $TcO_4^-$ is one of the most stable and unreactive forms of $^{99}$Tc. This chemical form is very mobile and exhibits little interaction with inorganic components in the geosphere (2–5,9). Reduced forms of Tc (for example, Tc(IV)) will be strongly absorbed and exhibit minimal migration. Even though the oxidation of $TcO_2$ (a major chemical found in spent reactor fuel) to $TcO_4^-$ in aerobic aqueous media is relatively slow (approximately 0.03% in 150 days (1–3,7) over many years a large percentage of conversion to $TcO_4^-$ will occur. Because of the low reactivity of $TcO_4^-$, the task of developing practical methods of removing this anion with a high degree of selectivity is formidable but also quite critical.

Various prior art methods have been used to separate $^{99}TcO_4^-$ from HLLW, ground water, and other media (2,6,10). These prior art methods include absorption on activated carbon (5) extraction into organic solvents containing Tc-acid ligands (3,6,9), extraction from liquid media into supported liquid membranes (SLM) (11,12) and sequestration by ion exchange processes (3,9,10,13).

Making $^{99}TcO_4^-$ more interactive by reduction to lower oxidation states is possible. However, the addition of reducing agents to complex chemical media makes this approach impractical. Accordingly, there remains a need for the development of technology that maintains simplicity while providing high selectivity and efficiency of removal of $^{99}TcO_4^-$ in order to produce a practical solution to this massive problem.

In developing the necessary technology regarding the above mentioned problems, such technologies must be suitable for the separation of $^{99}TcO_4^-$ from large quantities and large volumes of media. For example, removal of $^{99}TcO_4^-$ by selective extraction by passing large volumes of solutions containing solid support materials on columns with high affinity and specificity for $^{99}TcO_4^-$ or by adding suspensions of non-soluble materials, such as polymers, that will bind $^{99}TcO_4^-$ which can be sedimented or filtered from liquid systems would be attractive. The essential criteria that these materials must fulfill is the ability to provide a high degree of specificity for $^{99}TcO_4^-$ and a high binding affinity. Recent work by inventors of the present invention demonstrated the ability of triphenylphosphinimine ligands to efficiently extract tracer levels of $^{99m}$Tc as pertechnetate into organic solvents (Table 1) (14). The resulting product appeared to be an ion pair based on comparisons of the product formed in similar manner with $ReO_4^-$ (15). The data obtained with $^{99m}TcO_4^-$ suggested that phosphinimine (PN) ligands hold the potential to be used as a basis to design and develop new $^{99m}$Tc radiopharmaceutical applications in Nuclear Medicine (14).

Phosphinimine ligands have been polymerized for use in aerospace, implants, encapsulants, and other uses. Phosphines in any form (including monomers, polymers, or attached to other solid support) have not been successfully utilized at the single molecular level and have not before been applied for extraction of $^{99}TcO_4^-$ from liquid or solid wastes for environmental remediation.

The present invention provides a solution to the above discussed remediation problem by adapting the phosphinimine ligand technology to be usable for extracting $^{99}$Tc from various types of liquid media.

SUMMARY OF THE INVENTION

In accordance with the present invention, there is provided a method of treating liquid wastes containing $^{99}$Tc by exposing the media to monomeric and polymeric phosphinimines and then sequestering $^{99}$Tc from the media by the monomeric and polymeric phosphinimines that are present on solid matricies and in SLM materials.

The present invention further provides a system for treating liquid wastes containing $^{99}$Tc in media, the system including a container including an inlet and an outlet for allowing flow of media therethrough and an immobilized phosphinimine functionalities contained within the container.

The present invention finds utility in the treatment of various types of media, such as liquids containing radioactive wastes, including HLLW or those containing low-levels of radioactivity, that are present in the environment in areas, such as contaminated ground water, with high efficiency and good selectivity.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Generally, the present invention provides a method and system for treating liquid wastes containing $^{99}Tc$ in a media. The method is accomplished by the general steps of exposing the media to phosphinimines in solution forms or in immobilized forms and then sequestering $^{99}Tc$ from the media by the phosphinimine functionalities. That is, the phosphinimines are utilized to form complexes or ion pairs with specific $^{99}Tc$ as specifically described below.

Figure 1:
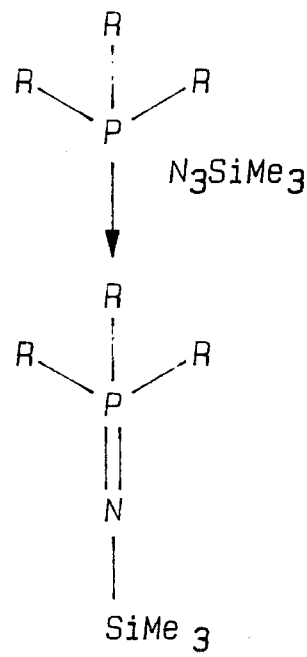
FIG. 1 shows the synthesis of functionalized phosphinimines.
Figure 2:
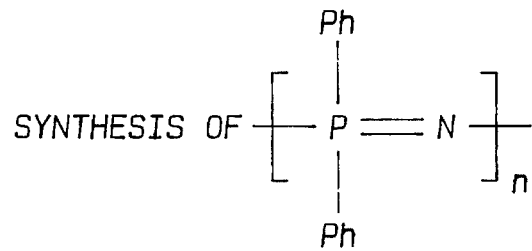
FIG. 2 shows the synthesis of phosphinimine polymers.
Figure 2:
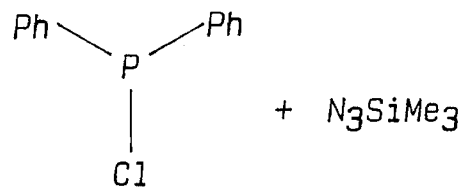
Figure 2:
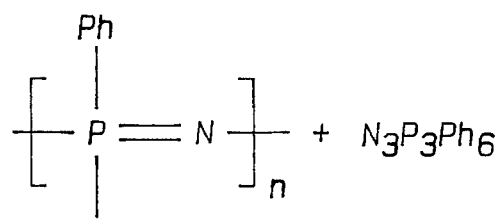

The complexing ligand structures of the phosphinimines utilized in accordance with the present invention include at least one phosphinimine functionality of the formula $$R_3P=N-$$

wherein the phosphinimine can be selected from the group consisting of monodentate, multifunctional and heterodifunctional ligands. Monodentate phosphinimines are those as described in the above formula. Multifunctional and heterdifunctional phosphinimine ligands have been developed in accordance with the present invention wherein additional functionalities are provided to add skeletal flexibility and stability for designing new complexes with transition metals and metallic radioisotopes, as demonstrated in the Example section below (see FIG. 1). A further alternative is the incorporation of phosphinimines by covalently bonding the phosphinimines on a polymer backbone to produce a polymer immobilized ligand system in accordance with the present invention (see FIG. 2). The phosphinimine ligand systems can be applied as stationary phases in chromatographic columns, as sequestering suspensions or as an integral part of SLMs for the treatment of liquid waste.

Figure 3:
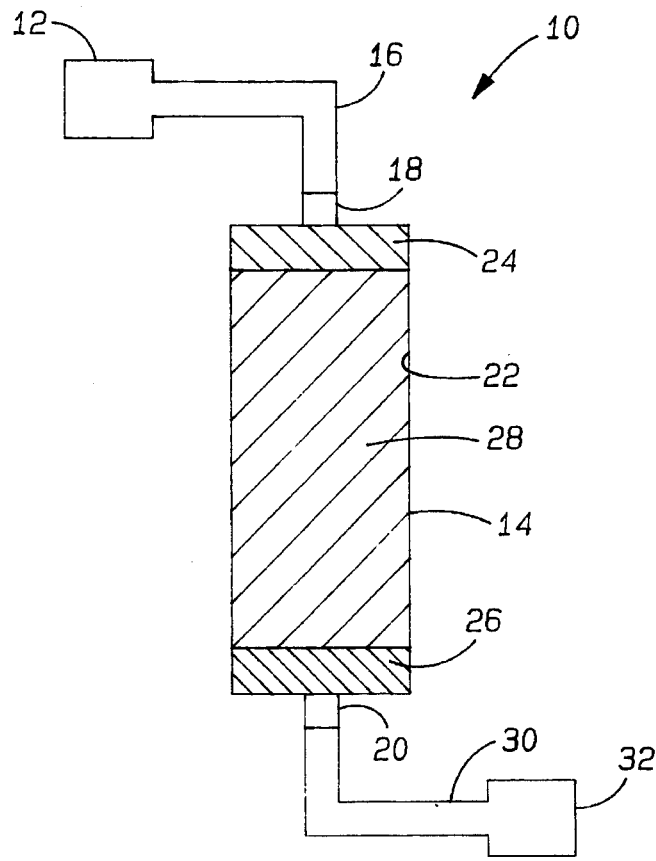
FIG. 3 is a schematic representation of a column constructed in accordance with the present invention.

A preferred mode of the present invention utilizes phosphinimines bonded to polymer backbones as part of a SLM or other solid supports (eg., silica gel and alumina) in an immobilized phosphinimine ligand system that is generally shown at 10 in FIG. 3. The system 10 includes a media source 12 which could either be a pond, media tank, or other source which can be either passively interconnected to a column or series of columns 14 through conduit(s) 16 or it can be actively transferred to the column by pumping means well known in the art. The column 14 is of the type well known in the art having an inlet 18 and outlet 20 to allow fluid flow therethrough. The column 14 includes an inner chamber 22. The column can be totally integral disposable column or it can be a column allowing replacement of the backing within the column. Shown in FIG. 3, the column 14 includes packing material 24,26 at each end thereof for entrapment of a phosphinimine ligand system schematically shown at 28, the packing 24,26 containing the ligand system 28 within the column. Various methods well known in the art can be used for packing the column 14 and also for maintaining the ligand system 28 within the column. Specific formulations and constructions of the ligand system are discussed below.

A conduit 30 provides fluid communication between the outlet 20 of the column 14 and a media collection site 32. The media collection site 32 can be in the form of a container, tanker, or the like. Alternatively, the media can be carried, passively or actively as described above, back to the original media site. Thusly, the present invention can be used in manners such as within a tanker truck or the like thereby providing a portable remediation center which can be carried to a site of contamination and used at that site for remediation of the contamination. Alternatively, the present invention can be constructed as a portable unit to also be used at sites of contamination. Other methods of constructing the present invention can additionally be used in accordance with the present invention.

As stated above, the container can be a column, such as chromatographic column 14 shown in FIG. 3. Column 14 contains the immobilized phosphinimine ligand system 28 within an internal compartment 22 thereof. The immobilized phosphinimine ligand system is preferably a stationary phase contained within the column 14 whereby the inventive method provides for directing a flow of the media through the stationary phase contained within the column 14. Accordingly, the media is brought in contact with the phosphinimine ligand system. The phosphinimine ligand system sequesters $^{99}Tc$ from the media such that once the media leaves the outlet 20 of the chromatographic column 14, significant amount of the contamination is removed therefrom. As stated above, the aforementioned step can also be accomplished by flowing the media through a sequestering suspension containing the immobilized phosphinimine ligand system.

The above described system utilizing a variety of immobilized phosphinimine ligand systems can be adapted for large scale industrial set ups because utilizing the present invention a large quantity can be produced in a one pot synthetic route a large quantity (greater than 100 grams) per reaction that produce little or no hazardous products, as described below. The ligand system thereby derived is stable so that it can be stored for long durations and can be easily transported. Such monomeric and polymeric ligand systems or other solid phase systems are stable at high temperatures of up to at least 150° to 200° C. Therefore, the present invention can also be used in scavenging operations that require elevated temperatures.

By methods well known in the art, the immobilized phosphinimine ligand systems can be made in the form of a powder or beads, the details of an example of a preparation being described below. In these forms, the phosphinimine ligands system made in accordance with the present invention can easily be packed into various type columns or used as various types of sequestering suspensions.

One immobilized phosphinimine ligand system made in accordance with the present invention consists essentially of linear phosphinimine polymers of the formula

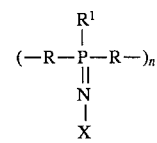

wherein R and $R^1$ are selected from the group consisting essentially of $C_6H_5$,n-Butyl,$C_2H_5$,$CH_3$,—$CH_2CH_2CN$,p-$C_6H_4Cl$,p-$C_6H_4Br$,—$OCH_2$=$CHCH_2$,—$NMe_2$,$NMeNH_2$. R and $R^1$ can be the same or different. X is selected from the group consisting of H and $SiMe_3$. n is 1 through 3. As shown in the Example section below, these polymers are air stable and also show unusual stability toward hydrolysis. A powdered form of these polymers can be used for the production of beads, as described in detail below, for application as stationary phases and chromatographic columns of as solid suspensions.

The phosphinimines of the present invention react by the following scheme

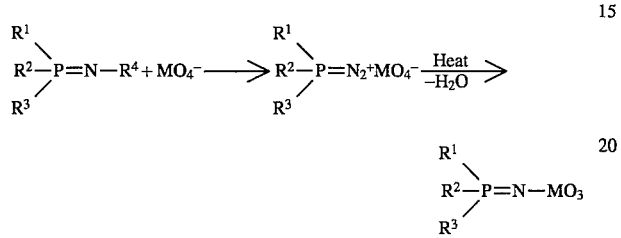

wherein M is $^{99}Tc$, wherein $R^1$, $R^2$, and $R^3$ are selected from the group consisting essentially of $C_6H_5$,n-Butyl,$C_2H_5$,$CH_3$, —$CH_2CH_2$ $CN$,p-$C_6H_4Cl$,p-$C_6H_4Br$,—$OCH_2$= $CHCH_2$,—$NMe_2$,$NMeNH_2$. $R^1$, $R^2$ and $R^3$ are the same or can be different. $R^4$ is selected from the group consisting of H and $SiMe_3$. More specifically, phosphinimines of the present invention can be designed to specifically sequester $^{99}TC$ as $^{99}TcO_4^-$. Since $^{99}Tc$ is a long-lived-radioisotope and makes up a dominant portion of the radionuclides found in radioactive wastes, the present invention finds great significance for use in the field of environmental remediation.

Phosphinimines of the present invention can take other useful forms which can be adapted for specific sequester needs. Phosphinimine can include a single PN group defined by the formula

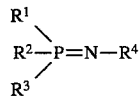

wherein $R^{1-3}$ can be selected from the group consisting essentially $C_6H_5$,n-Butyl,$C_2H_5$,$CH_3$,— $CH_2CH_2CN$,p-$C_6H_4Cl$,p-$C_6H_4Br$,—$OCH_2$=$CHCH_2$,—$NMe_2$,$NMeNH_2$ and can be the same or different from each other and $R^4$ is any group that is readily replaced by $TcO_4^-$. More specifically, $R^4$ is selected from the group consisting essentially of —$SiMe_3$, and —H. By selecting the appropriate $R^4$ group, transition metal oxide or halide ions of Tc react with the phosphiniminato ligands according to the reactions sequence described above.

Phosphinimine ligands have been extensively used in coordination chemistry of "early" and "late" transition metals. However, phosphinimine ligands have never been used as scavengers for $^{99}TcO_4^-$ in HLLW or low level radioactive liquids such as ground water containing $^{99}TcO_4^-$. Various compounds or substrates containing more than one phosphinimine group can also be used to sequester $^{99}TcO_4^-$ as described below.

An example of a phosphinimine ligand containing more than one phosphinimine functionality is of the formula

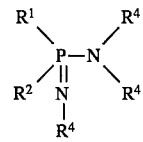

wherein $R^{1,2,4}$ are defined as above. As shown in the Example section below, this ligand has a strong affinity for $^{99}TcO_4^-$. The resulting complexes with Tc can be represented by the following

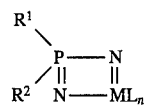

wherein $L_n$ is ligand selected from the group essentially of O and halogens and $R^1$ and $R^2$ are defined above.

An alternative compound including two phosphinimine functionalities is represented by the formula

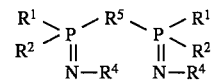

wherein $R^1$, $R^2$, and $R^4$ are defined as above and $R^5$ is selected from the group consisting essentially of —$(CH_2)_n$ wherein n is 1–4

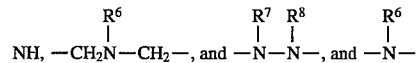

wherein $R^6$, $R^7$ and $R^8$ are selected from the group consisting essentially of H, Me and $C_2H_5$ and can be the same or different from each other.

Compounds or polymers can also be constructed in accordance with the present invention as illustrated in the Example section which includes more than two phosphinimine groups. Such compounds containing multiple-PN groups will strongly interact with $^{99}TcO_4^-$. Incorporation of phosphinimine ligands on polymer backbones, as described above, are also important because polymer immobilized ligands can exhibit higher selectivity for scavenging metal ions. Also, grafting of phosphinimine groups on specific repeating units along the polymer chain is feasible which in turn can prompt chelation of certain metal ions and metallic radioisotopes which may not be otherwise occur with the simple monomeric phosphinimines as described above. Further, polymer incorporated phosphinimines can be produced in the form of powders and beads of definite size as described above.

A further alternative is the use of homo- and co- polymers of phosphinimine monomers. More specifically, phosphinimines can be functionalized with olefinic monomers having the general structure shown in FIG. 4.

Figure 4:
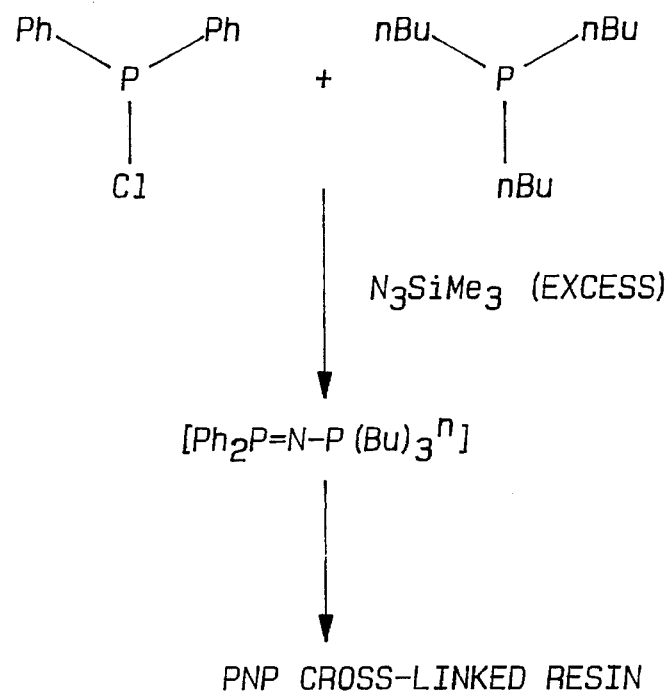
FIG. 4 shows the synthesis of phosphinimine polymers with mixed substituents.

Polymerization of these monomers can be accomplished by homopolymerization or copolymerization with selected organic monomers to form polymeric materials with the general structure as shown in FIG. 4.

The above mentioned polymers can be utilized with various olefinic monomers known in the art.

Figure 6:
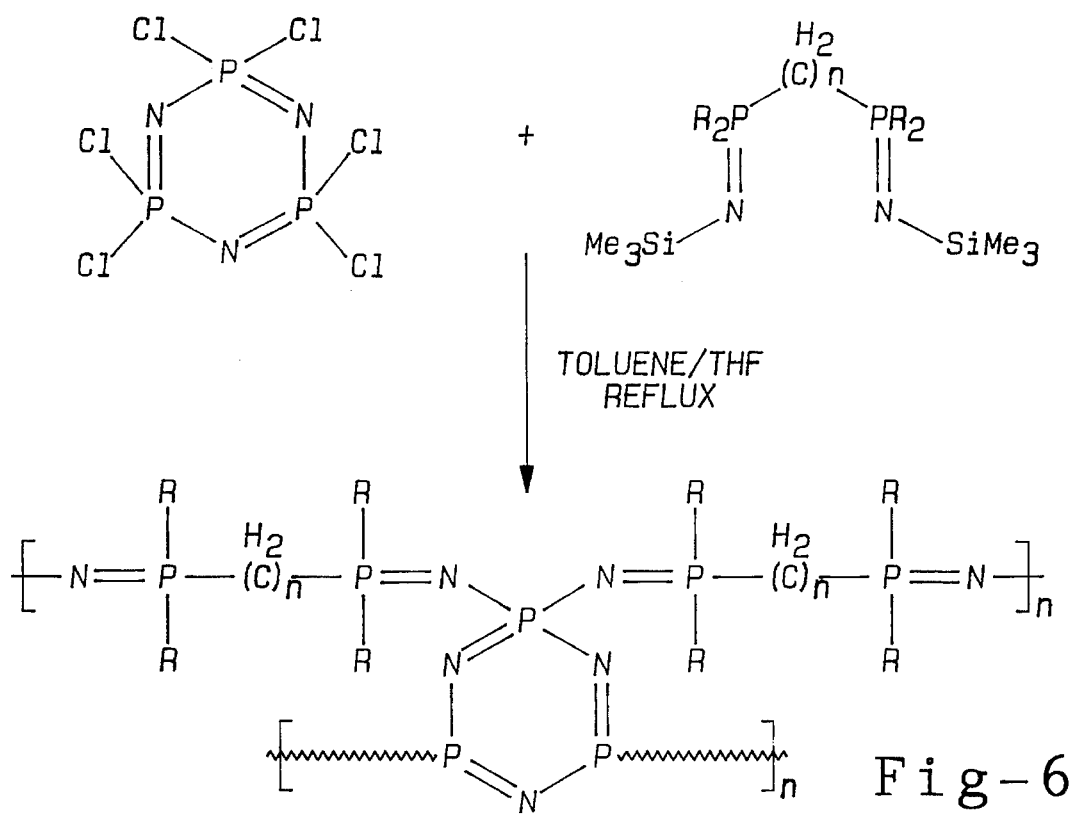
FIG. 6 shows phosphinimine based cyclomatrix polymers.

A further alternative of the present invention utilizes cyclomatrix polymers made in accordance with the present invention. Such cyclomatrix polymers have the formula shown in FIG. 6. Cyclomatrix PN-polymers present a further advantage over linear polymers because the molecular cavities, which are inherent in the structures of these polymers, can trap $^{99}TcO_4^-$ in a "host-guest" type interaction.

The above described ligands containing one or more -phosphinimine groups can be attached to materials commonly used as solid supports for chromatographic columns as described above or as insoluble suspensions utilizing silica gel, alumina, sephadex, cross-linked organic resins, or the like as is well known in the art. In these uses, one or more of the R groups attached to the PN ligand can be reacted with the solid matrix to irreversibly attach active -PN groups as described below. Compounds containing phosphinimine functionalities can also be used in supported liquid membranes (SLMs).

The following examples demonstrate the synthesis of the various monomers and polymers described above. The Examples further illustrate the utility of the invention to be able to selectively remove $^{99}TcO_4^-$ ions from contaminated media (See Table 3).

EXPERIMENTS

Synthesis of $R_3P=N-SiMe_3$ [$R=C_6H_5$, n-Butyl, $C_2H_5$,—$CH_2CH_2CN$, p-$C_6H_4Cl$, p-$C_6H_4Br$, p-$C_6H_4$ ($OCH_3$), $OH_2C=CHCH_2$ $NMe_2$, $NMeNH_2$]

Samples of the individual phosphines were heated under reflux for twelve hours with a large excess of azido trimethyl silane ($N_3SiMe_3$) (Azido trimethyl silane was used as both a solvent and reactant). The excess of azido trimethyl silane was removed in vacuo to obtain the functionalized phosphinimines $R_3P_2N$—$SiMe_3$in near quantitative yields. The chemical composition of all the new phosphinimines were established by $^1H$, $^{31}p$ NMR and mass spectrometry. The formation of the new compounds were also confirmed by C, H and N analytical data (this reaction is outlined in FIG. 1).

Synthesis of $[Ph_2P-N]_n$ (Polymer 1)

Diphenyl chlorophosphine (15g; 68 mmol) was introduced in a two liter two-necked flask arranged with a reflux condenser under a stream of dry $N_2$. The flask was cooled to ~60° C. before $N_3SiMe_3$ (100 g; 860 mmol) was added dropwise through the condenser inlet. The evolution of $N_2$, as a byproduct, was very violent. Therefore, it was necessary to keep the other opening of the flask unstoppered for the $N_2$ gas to escape from the reaction mixture. The evolution of $N_2$ gas ceased in ~30 minutes. The excess $N_3SiMe_3$ was removed in vacuo to obtain a solid residue. The residue was washed successively (3×50 mL) with toluene to dissolve $N_3P_3Ph_6$ which was formed as one of the products. The insoluble residue (4.5 gm) was identified as the phosphazene polymer $[Ph_2P=N]_n$ upon C, H and N analysis and $^{31}P$ NMR spectroscopy of its DMSO solutions (this reaction is outlined in FIG. 2).

Synthesis of Phosphinimine Polymers with Mixed Substituents on the Phosphorus Centers An equimolar mixture of $Ph_2PCl$ and $P(Bu^n)_3$ (20 g; 90 mmol of $Ph_2PCl$ and 15.09 g; 90 mmol of $P(Bu^n)_3$) was introduced in a two liter, two-necked flask arranged with a reflux condenser under a stream of dry $N_2$. Azido trimethyl saline (100 gm) was introduced into the flask through the reflux condenser. A vigorous reaction was noticed within ~5 minutes of mixing the contents. The reaction mixture was stirred for 30 minutes before the excess of $N_3SiMe_3$ was pumped off in vacuo to obtain a sticky white solid of the $[Ph_2P-N=PBu^n{}_2)_n$ polymer. The chemical composition of the polymer was confirmed by C, H and N analysis (this reaction is outlined in FIG. 4).

Synthesis of Phosphinimine Based Cyclomatrix Polymers

Toluene solutions of hexachlorocyclotriphosphazene ($N_3P_3Cl_6$) and $R_2P(CH_2)_nPR_2(NiSiMe_3)_2$ ($R=CH_3$, Ph, OPh, OMe; N=1, 2, 3) were mixed in a flask equipped with a reflux condenser. The contents of the flask were heated under reflux for ten hours before the solvent was removed in vacuo to obtain a shiny, sticky solid (or a fine powder depending on the nature of R and the size of the chain length n). The chemical constitution of the polymer was established by C,H, and N analysis and by $^1H/^{31}P$ NMR spectroscopy (this reaction is outlined in FIG. 6).

Synthesis of Cross Linked Phosphinimine Resins (Polymer 2)

Figure 5:
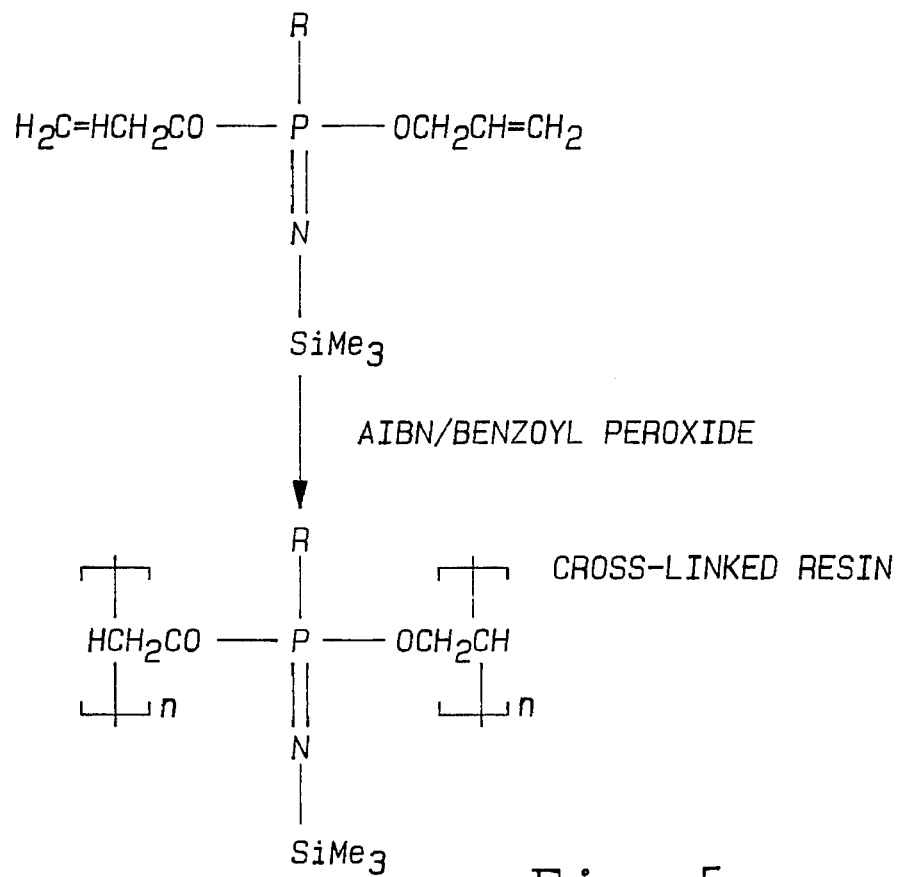
FIG. 5 shows the synthesis of cross-linked phosphinimine resins.

Trimethyl silyl (tris allyl) phosphinimine ($H_2C=CHCH_2O)_3P=NSiMe_3$ was prepared by the interaction of $P(CH=CH_2)_3$ with $N_3SiMe_3$ as described above. This compound was polymerized by the free radical polymineralization (in toluene of THF) using AIBN or benzoyl peroxide as initiators. The polymer is a sticky resin which upon heating to 100° C. turns into a brittle solid. This solid can be crushed to a fine powder. The chemical constitution of the polymer was established by C, H and N analysis (this reaction is outlined in FIG. 5).

Coating of Silica Gel and Alumina with $Ph_3P=N-SiMe_3$

Typically 2.5 to 5.0 grams of $Ph_3P=N-SiMe_3$ dissolved in 50 mL of dry chloroform was added to suspensions of 25 grams of silica gel or alumina for 30 minutes before the solvent was removed under vacuum (0.2 torr). Additional drying was effected upon subjecting the silica gel or alumina coated $Ph_3P=N-SiMe_3$ samples to high vacuum for 10 to 12 hours.

The extraction efficiency of $^{99m}TcO_4^-$ by $Ph_3P=N-SiMe_3$ in various solvents is shown in Table 1. High efficiency is obtained (over 99% for each solvent tested). Table 2 shows the extraction efficiency of $^{99}TcO_4^-$ by $Ph_3P=N-SiMe_3$ in the presence of high concentrations of anions in the aqueous layer. Again, percent partitioning is greater than 98% for each anion at the various concentrations tested.

Table 3 shows scavenging efficiency of $^{99m}TcO_4^-$ by two PN polymers synthesized as described hereinabove. Both polymers showed a greater than 99% scavenging efficiency.

Table 4 presents the results of elution of $^{99m}TcO_4^-$ from $Ph_3P=N-SiMe_3$-coated silica gel. Elution of $TcO_4^-$ with water from sep-pack columns loaded with $Ph_3P=N-SiMe_3$ coated silica gel showed retention of $TcO_4^-$ on the solid surface (i.e. the $Ph_3PNSiMe_3$-coated silica gel). The $Ph_3PNSiMe_3$-coated silica gel gave greater that 99% elution efficiency.

The above examples illustrate the method of making the phosphinimines in accordance with the present invention and the inventive methods utilizing such compound to remove waste contamination from various media. Accordingly, the present invention provides utility for waste site remediation.

The invention has been described in an illustrative manner, and it is to be understood that the terminology which has been used is intended to be in the nature of words of description rather than of limitation.

Obviously many modifications and variations of the present invention are possible in light of the above teachings. It is, therefore, to be understood that within the scope of the appended claims the invention may be practiced otherwise than as specifically described.

TABLE 1

Extraction Efficiency of $^{99m}TcO_4^-$ by $Ph_3P = NSiMe_3$ in Various Solvents[a]

| Solvent | % Extracted[b] |
|---|---|
| $CHCl_3$ | 99.01 |
| $CH_2Cl_2$ | 99.5 |
| $CCl_4$ | 99.0 |
| Toluene | 99.0 |
| THF | 99.5 |

[a]0.1 mL of $^{99m}TcO_4^-$ *100–500 µCi) was mixed with 1–5 mL. Solutions of $Ph_3P = N-SiMe_3$ in the above solvents (5–10 mg/mL) and vortexed for 1 minute before separating the organic layers.
[b]The % extracted values are the average values obtained from five separate experiments.

TABLE 2

Extraction Efficiency of $^{99m}TcO_4^-$ by $Ph_3PN\ SiMe_3$ in the presence of high concentrations of anions in the aqueous layer

| Anion | Conc (M/L) | pH | % Partition[a,b] |
|---|---|---|---|
| $NO_3^-$ | 3N | 2 | 99.1 |
| | 1N | 3 | 99.2 |
| $Cl^-$ | 3N | 1 | 98.5 |
| | 1N | 3 | 99.2 |
| $OH^-$ | 5N | 12 | 98.0 |
| | 2N | 10 | 98.7 |

[a]Partition Ratio = ratio of #µCi $^{99m}TcO_4^-$ per mL in organic layer (containing 10 mg/ml $Ph_3PNSiMe_3$) to #µCi $^{99m}TcO_4^-$ per mL of aqueous layer. These ratios were obtained by vortexing equal volumes of organic and aqueous layers for 1 min.
[b]Average of five experiments.

TABLE 3

| Suspension | % on Polymer (i.e., on filter) | % in aqueous medium (i.e., in filtrate) |
|---|---|---|
| Controls | 1.0 | 99 |
| Polymer | 99.3 | 0.7 |
| Polymer 2 | 99.5 | 0.5 |

[a]Average of five experiments.
SCAVENGING EFFICIENCY OF $^{99}TcO_4^-$ BY PN POLYMERS

TABLE 4

Elution of $^{99m}TcO_4^-$ from $Ph_3PNSiMe_3$-coated silica gel[a]

| Stationary Phase | % on Stationary Phase | % in Aqueous Medium |
|---|---|---|
| Silica gel | <0.1 | 99.9 |
| $Ph_3PNSiMe_3$-coated silica gel | 99.9 | <0.1 |

[a]Average of five experiments.
[b]1–2 mCi of aqueous solutions (5–10 mL) of $^{99m}TcO_4^-$ were used for elution sep-pack columns with 2.5 gms of the coated/uncoated silica gel.

What is claimed is:

1. A method of removing $TcO_4^-$ from liquid wastes in a media by
    a) bringing phosphinimines into contact with the media
    b) sequestering $TcO_4^-$ from the media by the phosphinimines and separating the phosphinimine sequestered $TcO_4^-$ from the media.

2. A method as set forth in claim 1 wherein said phosphinimines include at least one phosphinimine functionality of the formula $$R_3P=N-,$$

wherein the phosphinimines are selected from the group consisting of monodentate, multidentate, and heterdifunctional ligands.

3. A method as set forth in claim 2 wherein the multidentate ligands are selected from the group consisting of multifunctional and heterofunctional phosphinimine ligands.

4. A method as set forth in claim 3 wherein said heterofunctional phosphinimine ligands include functionalities for providing skeletal flexibility and stability to complexes formed from the ligands sequestering $TcO_4^-$ 5. A method as set forth in claim 2 wherein said step (a) is further defined as flowing the media through a container which contains an immobilized phosphinimine ligand system.

6. A method as set forth in claim 5 wherein the phosphinimines are covalently bound to a polymer backbone thereby forming the immobilized phosphinimine ligands system.

7. A method as set forth in claim 6 wherein the container is a chromatographic column, the immobilized phosphinimine ligand system being a stationary phase contained within the column, said step (a) being further defined as directing a flow of the media through the stationary phase contained within the column.

8. A method as set forth in claim 6 wherein step (a) is further defined as directing a flow of the media through a sequestering suspension containing the immobilized phosphinimine's ligand system.

9. A method as set forth in claim 6 wherein the immobilized phosphinimine liquid system is in the form of a powder or beads.

10. A method as set forth in claim 9 wherein the immobilized phosphinimines liquid system consists of linear phosphinimines polymers of the formula

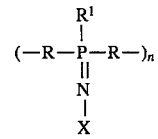

wherein R and $R^1$ are selected from the group consisting of $C_6H_5$,n-Butyl,$C_2H_5$,$CH_3$,— $CH_2CH_2CN$,p-$C_6H_4Cl$,p-$C_6H_4Br$,—$OCH_2=CHCH_2$,— $NMe_2$,$NMeNH_2$, and can be the same or different, n is 1 to 3, and X is selected from the group consisting of H and $SiMe_3$.

11. A method as set forth in claim 2 wherein the phosphinimine includes a single PN group and is defined by the formula

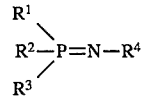

wherein $R^{1-3}$ are selected from the group consisting of $C_6H_5$,n-Butyl,$C_2H_5$,$CH_3$,—$CH_2CH_2CN$, p-$C_6$ $H_4Cl$, p-$C_6H_4Br$,—$OCH_2$=$CHCH_2$,—$NMe_2$,$NMeNH_2$, and are the same or different from each other, and $R^4$ is selected from the group consisting of —$SiMe_3$ and —H.

12. A method as set forth in claim 11 wherein the phosphinimine reacts with $TcO_4^-$ according to the reaction

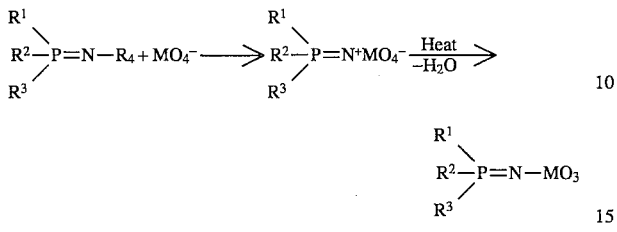

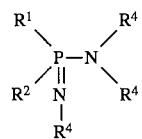

wherein M is $^{99}Tc$.

13. A method as set forth in claim 12 wherein the phosphinimine is functionalized with olefinic monomers.

14. A method as set forth in claim 13 wherein the phosphinimine is a homopolymer with the olefinic monomers.

15. A method as set forth in claim 13 wherein the phosphinimine is a copolymer with the olefinic monomers and organic monomers.

16. A method as set forth in claim 2 wherein the phosphinimine is of the formula wherein $R^{1,2}$ is selected from the group consisting of $C_6H_5$, n-Butyl, $C_2H_5$, $CH_3$, —$CH_2CH_2CN$, p-$C_6H_4Cl$, p-$C_6H_4Br$, —$OCH_2$=$CHCH_2$,—$NMe_2$,$NMeNH_2$, and is the same or different from each other, and $R^4$ is selected from the group consisting of —$SiMe_3$ and —H.

17. A method as set forth in claim 2 wherein the phosphinimine is of the formula

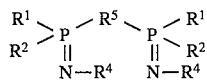

wherein $R^1$ and $R^2$ are each selected from the group consisting of $C_6H_5$, n-Butyl, $C_2H_5$, $CH_3$, —$CH_2CH_2CN$, p-$C_6H_4Cl$, p-$C_6H_4Br$,—$OCH_2$=$CHCH_2$, —$NMe_2$, $NMeNH_2$, $R^4$ is any group that is readily replaced by $TcO_4^-$, and $R^5$ is selected from the group consisting of —$(CH_2)_n$ wherein n is 1–4,

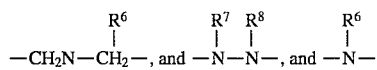

wherein $R^6$, $R^7$ and $R^8$ are selected from the group consisting of H, Me or $C_2H_5$ and are the same or different from each other.

18. A method as set forth in claim 2 wherein the phosphinimine is a cyclomatrix polymer.

19. A method of removing $^{99}TcO_4^-$ by selectively sequestering $^{99}TcO_4^-$ from radioactive liquid waste and other liquids containing low levels of radioactivity by contacting the radioactive liquid waste and the other liquids containing low levels of radioactivity with phosphinimines and separating the phosphinimine sequestered $^{99}TcO_4^-$ from the liquid.

* * * * *